US012239601B2

(12) United States Patent
Partsch

(10) Patent No.: US 12,239,601 B2
(45) Date of Patent: Mar. 4, 2025

(54) CABIN FOR STEAM-BATHING INDIVIDUALS

(71) Applicant: KLAFS GMBH, Schwäbisch Hall (DE)

(72) Inventor: Andreas Partsch, Gründau-Lieblos (DE)

(73) Assignee: KLAFS GMBH, Schwäbisch Hall (DE)

( * ) Notice: Subject to any disclaimer, the term of this patent is extended or adjusted under 35 U.S.C. 154(b) by 783 days.

(21) Appl. No.: 17/055,181

(22) PCT Filed: May 15, 2019

(86) PCT No.: PCT/EP2019/062525
§ 371 (c)(1),
(2) Date: Nov. 13, 2020

(87) PCT Pub. No.: WO2019/219768
PCT Pub. Date: Nov. 21, 2019

(65) Prior Publication Data

US 2021/0177695 A1 Jun. 17, 2021

(30) Foreign Application Priority Data

May 17, 2018 (EP) .................................... 18172958

(51) Int. Cl.
*A61H 33/06* (2006.01)
*A61H 33/00* (2006.01)

(52) U.S. Cl.
CPC ....... *A61H 33/067* (2013.01); *A61H 33/6005* (2013.01); *A61H 33/6068* (2013.01); *A61H 2033/068* (2013.01); *A61H 2203/0431* (2013.01)

(58) Field of Classification Search
CPC .................................................... A61H 33/067
See application file for complete search history.

(56) References Cited

U.S. PATENT DOCUMENTS 3,655,135 A * 4/1972 Altman .................. A47K 17/00 239/521
5,413,128 A * 5/1995 Butts ......................... B60S 3/04 134/123

(Continued)

FOREIGN PATENT DOCUMENTS

DE 19606346 C2 7/1998
DE 200 19 159 U1 3/2001

(Continued)

OTHER PUBLICATIONS

International Search Report issued in corresponding International Patent Application No. PCT/EP2019/062525 dated Sep. 12, 2019, with English translation.

(Continued)

*Primary Examiner* — Jonathan T Kuo
*Assistant Examiner* — Thien Jason Tran
(74) *Attorney, Agent, or Firm* — Bochner PLLC; Andrew Bochner

(57) ABSTRACT

The invention relates to a cabin for steam-bathing individuals, into which fresh air is admitted and waste air is discharged during the operation, and steam is thereby admitted at least temporarily and foam is admitted simultaneously or alternately, so that the individuals located in said cabin are bathed simultaneously in steam and in foam. The simultaneous bathing of individuals in steam and in foam provides physical relaxation and cleanses the skin. A method for operating the cabin is also claimed. The foam is thereby admitted into the lower part of the cabin, and the steam is admitted into the upper part of the cabin. In a preferred embodiment of the method, the foam is admitted into the cabin at such a level that the individuals sitting on the seating area of the cabin sit in a carpet of foam.

25 Claims, 1 Drawing Sheet

(56) References Cited

U.S. PATENT DOCUMENTS

| | | | | |
|---|---|---|---|---|
| 5,842,645 | A | 12/1998 | Degongre et al. | |
| 2009/0019634 | A1* | 1/2009 | Lipponen | A61H 9/0071 4/524 |
| 2012/0233765 | A1 | 9/2012 | Altman et al. | |
| 2012/0266874 | A1* | 10/2012 | Kawakami | A61G 10/023 128/202.12 |
| 2014/0171270 | A1* | 6/2014 | Frolov | A63B 35/00 482/55 |
| 2014/0345041 | A1* | 11/2014 | Barghelame | A61H 33/066 4/526 |
| 2016/0271012 | A1* | 9/2016 | Xu | A61H 33/6021 |

FOREIGN PATENT DOCUMENTS

| | | | |
|---|---|---|---|
| DE | 10 2008 056 587 | A1 | 5/2009 |
| EP | 0 252 163 | B1 | 1/1991 |
| EP | 0 779 067 | A2 | 6/1997 |
| EP | 1 270 828 | A1 | 1/2003 |
| EP | 2 990 023 | A1 | 3/2016 |
| WO | 2005/036055 | A2 | 4/2005 |

OTHER PUBLICATIONS

International Preliminary Report on Patentability issued in corresponding International Patent Application No. PCT/EP2019/062525 dated Nov. 17, 2020.

* cited by examiner

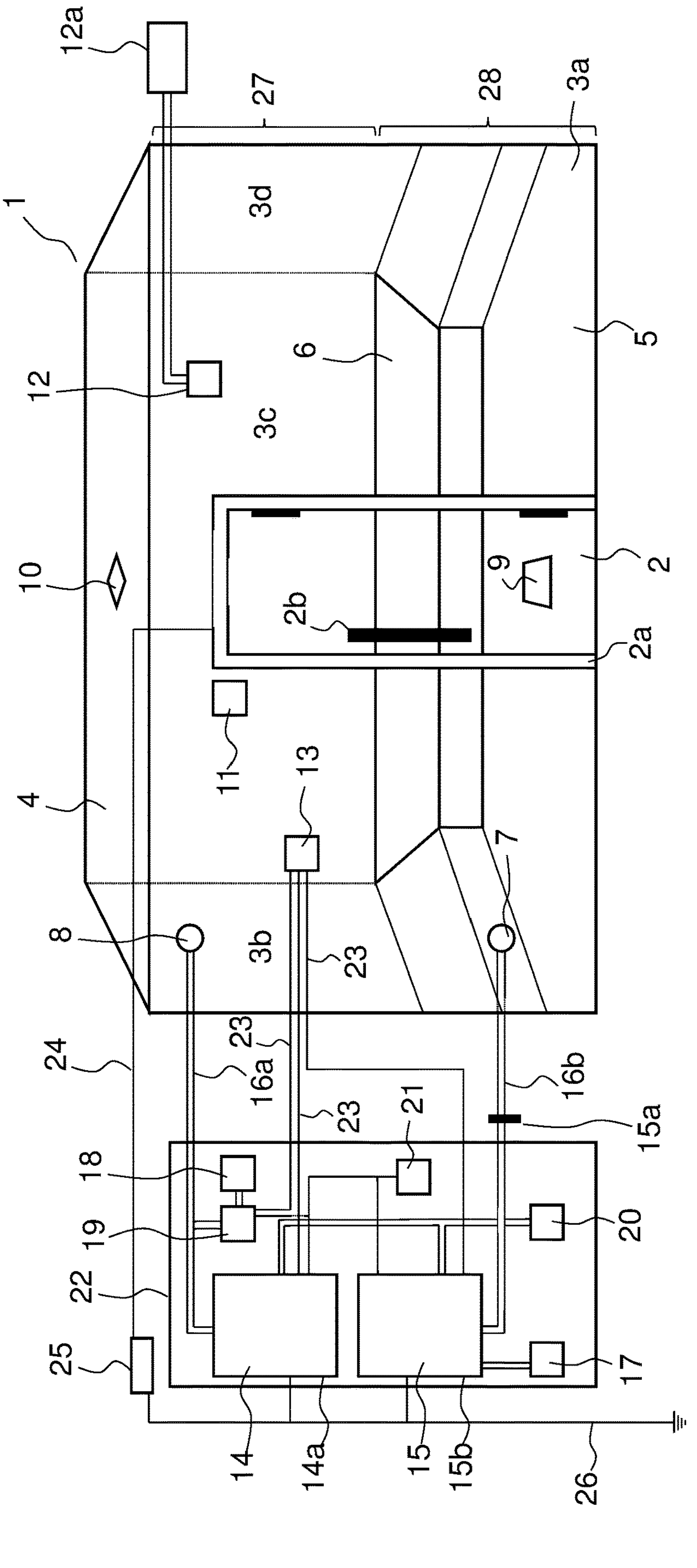
12a
27
28
3a
1
3d
6
5
12
3c
10
2
9
2b
2a
11
4
13
7
8
3b
23
24
23
16a
16b
23
21
15a
18
20
19
22
25
17
14
14a
15
15b
26

CABIN FOR STEAM-BATHING INDIVIDUALS

CROSS REFERENCE TO RELATED APPLICATIONS

This is a U.S. National Phase application under 35 U.S.C. § 371 of International Patent Application No. PCT/EP2019/062525, filed May 15, 2019, which claims priority of European Patent Application No. 18172958.3, filed May 17, 2018. The entire contents of which are hereby incorporated by reference.

FIELD OF THE INVENTION

The invention relates to a cabin for steam-bathing individuals, into which fresh air is admitted and waste air is discharged during the operation, and steam is thereby admitted at least temporarily and foam is admitted simultaneously or alternately, so that the individuals located in said cabin are bathed simultaneously in steam and in foam. The simultaneous bathing of individuals in steam and in foam provides physical relaxation and cleanses the skin. A method for operating the cabin is also claimed. The foam is thereby admitted into the lower part of the cabin, and the steam is admitted into the upper part of the cabin. In a preferred embodiment of the method, the foam is admitted into the cabin at such a level that the individuals sitting on the seating area of the cabin sit in a carpet of foam.

BACKGROUND OF THE INVENTION

Steam baths for steam-bathing individuals are known in the prior art. Steam baths are often used in cabins, in which the individuals, which are to be steam-bathed, are located, wherein the internal temperature of the cabin is simultaneously increased by means of the introduced steam or by means of an additional independent heat source. Cabins, in which individuals are steam-bathed at increased internal temperature, are also very widespread in everyday life and are commonly known as saunas. Saunas thereby provide physical relaxation, cleanse the skin, stimulate the circulation, and improve well-being.

Document US20120233765A1 describes a steam bath system, which reacts to acoustic commands and can be controlled thereby, wherein the control controls a water flow, the water temperature of the water flow, the steam flow rate, the relative humidity in the steam bath, and furthermore possible optical effects, a background music, fragrance supply, a radio system, a television system, a DVD player or a CD player, via an acoustic receiving unit located inside the steam bath system and a control unit located outside the steam bath system. In a preferred embodiment, a touch-sensitive screen is used for the control by means of the acoustic receiving unit, and the information transfer from the acoustic receiving unit and the touch-sensitive screen from the steam bath system to the control unit is performed with the help of radio transmission.

Document EP0252163B1 describes a steam bath cabin, which comprises at least three cabin walls and a cabin roof, wherein at least the cabin walls are formed by individual, joined profile tub elements, which have a heat insulation, each comprising a profile floor and at least two longitudinal walls, and wherein openings for admitting steam and the waste air as well as a door are provided, and wherein the profile tub elements consist of metal and are joined via groove and tongue joints, in that a respective longitudinal wall of one of the profile tub elements has a groove, and the abutting longitudinal wall of the adjacent profile tub element has a spring attachment, and the groove as well as the spring attachment, which fits in the groove, are each formed by two web attachments of the longitudinal walls, which are spaced apart from one another parallel to one another and to the profile floor.

SUMMARY OF THE INVENTION

The steam baths from the prior art, however, are limited to a steam or water flow, which is discharged from the cabin of the steam bath again within relatively short periods of time, so that active substances contained in the steam or the water do not remain in the cabin for a long period of time. It is often desired, however, to introduce physiologically effective active substances into the cabin of a steam bath, which remain in the cabin for a longer period of time and thus develop a lasting pleasant, stimulating, and also medical effect. Examples are skin care products or products stimulating the respiratory tract, which develop the desired effect only when remaining in the cabin for a longer period of time.

The object is thus to provide a steam bath, into which a physiologically effective active substance can be introduced even for a longer period of time compared to the steam baths from the prior art. The present invention solves this object by means of a steam bath, into which steam is admitted into the upper part in the conventional way, and foam is admitted into the lower part, wherein the foam remains in the cabin for a longer period of time, and can be filled into the cabin up to any fill level. The fell level is thereby limited only by the level of the remaining inlets and outlets. During practical operation, the fill level of the foam is mostly selected in such a way, however, that the occupants of the cabin are covered with foam up to the level of the abdomen when taking a seat on the seat means.

A steam bath is discussed as part of this patent application, but the patent application and the underlying facts also apply equally and for the same purpose to the sauna. The sauna thereby differs from a steam bath only in that the sauna is heated by an additional independent heat source. The present invention can thus also be realized with an additional independent heat source in the same way.

The cabin of the present invention can be identified with the term "Fostarium". This term consists of the words "foam", "steam", and of the word part "-arium" for containers.

The term "foam" defined in this patent application identifies in particular soap lather, which is produced from water and commercially available soap by combining and admixing. To define the foam for the present invention, however, "foam" is understood to be every accumulation of small bubbles in a liquid medium, which is generated by admixing surfactants into the liquid medium. The term "steam" defined in this patent application identifies in particular water vapor. However, the definition "steam" for the present invention includes a water vapor, which is pure, and also a water vapor, which contains admixtures. It is possible in particular that the water vapor includes admixtures, which increase the comfort for staying in the cabin or which have a physiological effect.

What is claimed is a cabin for steam-bathing individuals, containing at least two outer walls, an access door, a cabin floor, and a cabin ceiling, wherein the cabin comprises a supply opening for water vapor, a supply opening for fresh air, a drain, and a waste air outlet, and a seat means for cabin occupants to take a seat is present in the cabin, and the surface materials of the cabin consist of a water-resistant material, and the cabin has control and regulating means, by means of which the steam content in the cabin can be regulated accurately, and the performance of which is adapted to the cabin size, and the cabin has a potential compensation for compensating electrical and electrostatic charges, and which is characterized in that a further inlet for foam is present in the cabin, which is arranged below the supply opening for water vapor, the supply opening for fresh air, and below the waste air outlet, and the cabin has control and regulating means, by means of which foam can be generated and can be supplied into the cabin in a defined amount.

In a preferred embodiment, the cabin of the present invention has four cabin walls. For the embodiment of the invention, it is also possible, however, to provide only three or two cabin walls, when the cabin is installed, for example, against the wall or in the corner of a room. The wall, against which the cabin is installed, or the corner, against which the cabin is installed, form the cabin walls in this case. The cabin is preferably designed to have a rectangular layout, but can also comprise other arbitrary geometric shapes. The cabin can also comprise a roof. In this case, a pressure compensation has to be provided in any event. Said pressure compensation can be of an arbitrary nature, but is preferably formed by the waste air outlet. The cabin also contains a device for the potential compensation. In a conventional design, they are metal cables, which connect a part of the cabin, for example the door and the technical means, to the ground conductor. It is avoided thereby that, when touching the cabin, the occupants or passers-by experience electrical shocks, which are caused by electrical or electrostatic charge.

The cabin is of such a nature that it is suitable as steam bath or sauna. This means that, in a conventional embodiment, it is closed in order to keep the heat loss small. However, it is also possible as part of the invention that the cabin does not comprise a roof. In the case of cabins, this is the case in particular the case in rooms, which are heated and ventilated specifically for this purpose. The cabin usually also has a door, through which the individuals using it can enter or leave the cabin. Doors for steam baths and saunas are known in the prior art.

In a conventional embodiment, the cabin also contains an independent means for heating and a thermostat for controlling the internal temperature. The internal temperature can also be set accurately thereby.

In one embodiment of the invention, the regulating means for regulating the water vapor content is an evaporator unit for water by heat, which is connected to the cabin via lines and the supply opening for steam. Evaporator units for water by heat, by means of which steam baths are supplied with steam, are known in the prior art. Examples for evaporator units of this type are provided in WO2005036055A2 or in DE19606346C2. In an exemplary embodiment, the evaporator unit can be a container comprising heating elements and a discharge line for the generated water vapor.

In a further embodiment of the invention, the regulating means for the foam is a foam generator, which comprises an admixer for foam-forming surfactants into a water supply, a mixing means, and a discharge line for the generated foam, wherein the discharge line is connected to the inlet opening for foam in the cabin. Examples for foam generators can be found in EP1270828A1 or U.S. Pat. No. 5,842,645A. The generated foam can be discharged and can be supplied to the cabin. In an advantageous embodiment, a valve is arranged for this purpose in the foam generator, downstream from the foam generator in the flow direction, or a pump is arranged in the discharge line, by means of which the foam can be conveyed into the cabin. In a further advantageous embodiment, the foam is pressurized in the foam generator, so that the foam is guided into the cabin by opening the valve.

To embody the invention, a push button switch can be present in the cabin for supplying the foam, which controls the regulating means for the foam, the valve downstream from the foam generator, or the pump in the discharge line for the generated foam, and thus conveys foam into the cabin for a certain period of time.

In an embodiment of the invention, it is possible to guide fragrances into the cabin with the steam. For this purpose, a regulating means for adding fragrances into the water vapor is present at or in the supply line for the water vapor into the cabin. In an exemplary embodiment, this could be a container for fragrances and a pump for the fragrances, which supplies the fragrance from the fragrance container into the line to the supply opening for steam into the cabin. For example, a vaporizer can be arranged downstream from the pump. The addition of the fragrances takes place, for example, as aerosol by dispersion or as steam by simple evaporation in the correct dosage. The fragrances can also be supplied into the foam. By supplying fragrances, the interior of the cabin can be equipped with a pleasant smell during the steam-bathing. This increases the well-being of the occupants of the cabin. Fragrances for steam baths and saunas are known in the prior art.

As part of the invention, it is also possible to add physiologically effective components instead of or in addition to the fragrances to the water vapor. These physiologically effective components can be added to the water vapor, for example, as aerosols, analogously to the fragrances. A medical effect, which is advantageous for the occupants, can be attained thereby.

In an advantageous embodiment of the cabin, the water-resistant surface materials in the interior of the cabin consist of fine stone material, glass, plastics, or acrylic plastics. These materials are water-resistant and provide for a long service life of the cabin, even in the case of a longer operating time and frequent use of the steam bath.

Sensors are also arranged in the cabin, by means of which the data required to control the regulating means are collected in the cabin. These sensors are connected to the regulating means for the parameters via suitable transmission means, which are controlled via the collected data. For example, cables are suitable transmission means. However, wireless transmission means can also be suitable transmission means.

To accommodate the technical auxiliary units, a utility room is located outside of the cabin, in which the regulating means for the water vapor and the regulating means for the foam are arranged. By means of this utility room, the auxiliary units can be better protected against mechanical impacts, but also against physical impacts, such as, for example, the produced steam, against water, and the generated heat. The auxiliary units mainly include the regulating means for the water vapor and the regulating means for the foam. However, the auxiliary units can also include, for example, valves, thermostats, sensors, electrical auxiliary means, ventilators, pumps, and heating means. These means can be protected well against mechanical and physical impacts by being arranged in the utility room.

The device according to the invention also includes installation objects and auxiliary units, which are essential for the operation of steam baths and saunas. They are, for example, valves, thermostats, sensors, electrical auxiliary means, ventilators, cables, pumps, pipes, hoses, and heating means. These auxiliary means are known in the prior art.

A method for operating the cabin of the present invention is also claimed. What is claimed is a method for operating this cabin, which is characterized in that fresh air is admitted into the cabin, and waste air is discharged, and water vapor and foam are meanwhile introduced at least temporarily simultaneously or alternately. The cabin can be used commercially as well as privately.

In response to an operation of the cabin, steam and foam are usually admitted simultaneously into the cabin for the time period designated for the operation. For carrying out the method of the present invention, it is readily possibly to alternately admit steam and foam into the cabin for the period of time designated for the operation. Alternately is thereby also understood to be an operation, by means of which rest periods without introduction take place between the introduction of steam and of foam, wherein the rest periods are calculated such that the foam does not lose its effect.

In an advantageous embodiment of the method, the cabin is operated at an internal temperature of 40 to 50° C. As part of the present invention, the introduced steam as well as independent heaters can be used for the heat-up to this temperature. The exact setting thereby takes place by means of a thermostat and a control means for the steam or the independent heater. Even though an operation of the cabin without temperature regulation is conceivable, it is usually not desired. In a further advantageous embodiment of the method, the cabin is operated at a relative humidity of 100%.

The setting of this humidity advantageously takes place by means of the introduced steam. However, the setting of the humidity can additionally also take place by means of independent humidifiers, so as not to cause an excessive heating due to the introduced steam. The exact setting of the humidity thereby takes place by means of a moisture measuring device, and the control means for the regulating means for the steam, or for the independent humidifier.

The amount and the fill level of the foam are also reached by means of the regulating device for the addition of foam. In a simple embodiment, the regulating device for the addition of foam is a foam generator. The amount of foam is thereby controlled by means of a control means, which controls the foam generator, a pump downstream from the foam generator, or a valve, in the flow direction downstream from the foam generator. The exact amount of foam and also the foam level can be controlled in the cabin by means of a foam detector, which is based, for example, on an optical detection. In an exemplary embodiment of the invention, the foam is introduced into the cabin in such an amount that it is above the level of the seat means in the cabin, so that the individuals located in the cabin sit in a carpet of foam. When taking a seat on the seat means, the occupants of the cabin are thus covered with foam up to level of the abdomen. However, higher or lower foam levels are also covered by the invention. The supply of the foam into the cabin can take place, for example, by means of a push button switch, which is arranged in the cabin and which, by being pressed, controls the foam generator, the pump for the foam, or the valve downstream from the foam generator.

In an embodiment of the method for operating the cabin, fragrances are added into the steam or into the foam. These fragrances are preferably added in the form of a fragrance emulsion. In an advantageous embodiment, the fragrance addition thereby takes place by means of a fragrance container, which is connected to a fragrance pump. The fragrance pump, in turn, is connected to a supply line into the steam supply line into the cabin. A valve can be arranged in the supply line for the fragrance into the steam supply line into the cabin. The addition of the fragrance thereby takes place by operating the fragrance pump or the valve. The supply of physiologically active substances into the steam or into the foam can take place in the same way. The addition of the physiologically active substances can also be made in a mixture with the fragrances The cabin according to the invention and the method for operating the cabin according to the invention have the advantage of providing a steam bath, into which steam as well as foam are introduced. This is highly advantageous for the physical relation and for cleansing the skin. By adding physiologically effective substances into the steam or into the foam, excellent medical effects can also be attained.

DETAILED DESCRIPTION OF THE DRAWING

The invention will be described in more detail on the basis of a drawing, whereby the drawing only represents one embodiment of the invention and the invention is not limited thereto.

The drawing FIG. 1 shows a cabin (1), which falls under the claim of the present invention, in frontal view. What can be seen is the cabin (1) comprising an entrance door (2). The entrance door (2) is framed in a frame (2*a*) made of metal and is equipped with a door handle (2*b*). The cabin (1) itself is constructed of four outer walls (3*a*-*d*), a cabin roof (4), and a cabin floor (5). A seat means (6), on which the individuals, who want to take a steam bath or enjoy a sauna session, can take a seat, is arranged in the cabin (1). An inlet (7) for the foam is arranged in the seat means (6). An inlet (8) for the steam is arranged above the seat means (6). For the embodiment of the invention, the inlet (7) for the foam can also be arranged above or below the seat means (6). Said inlet, however, is arranged below the inlet (8) for the steam, and below the remaining inlets and outlets, with the exception of the drain (9). A drain (9), which is provided for discharging liquid, for example condensed water vapor or demulsified foam, is arranged in the cabin floor (5). An illumination (10) is arranged in the cabin roof (4). For the embodiment of the invention, the illumination (10), however, can also be arranged at the outer walls (3*a*-*d*) or in the cabin floor (5). A supply opening (11) for fresh air and a waste air outlet (12) are also arranged in the cabin (1). The waste air outlet (12) leads into a waste air system (12*a*), which leads the waste air from the cabin (1) and from the room, in which the cabin (1) is operated, into the atmosphere. The waste air system (12*a*) contains means, which convey the waste air into the atmosphere by being impacted, for example a waste air ventilator. Sensors (13) for controlling, by means of which the data provided for controlling and regulating are collected in the cabin (1), are also arranged in the cabin (1). The sensors (13) are connected to the corresponding regulating means (14,15). They are an evaporator unit (14) for generating steam and a foam generator (15) for providing foam. The evaporator unit (14) and the foam generator (15) provide the steam and the foam under pressure, so that no pump for conveying steam and foam into the cabin (1) is required in this case. The evaporator unit (14) and the foam generator (15) are connected via lines (16*a*) for steam or lines (16*b*) for foam to the inlet (7) for foam, and to the inlet (8) for the steam in the cabin (1). The foam generator (15) is connected to a container (17) for a foam concentrate. Said container doses the foam concentrate into the foam generator (15) upon request. The foam is provided under pressure in the foam generator. By opening a valve (15*a*), said foam is conveyed into the cabin (1). To apply a fragrance to the cabin (1), a fragrance container (18) is also present. The fragrance container (18) is connected to a fragrance pump (19), which conveys the fragrance from the fragrance container (18) into the line (16*a*) for the steam upon request. The evaporator unit (14) and the foam generator (15) are furthermore connected to a connection (20) for water and waste water. The evaporator unit (14), the foam generator (15), the fragrance pump (19), and optionally also the fragrance container (18) are equipped with a power supply means (21). The evaporator unit (14), the foam generator (15), the fragrance pump (19), and the fragrance container (18) are collectively accommodated in a utility room (22). These means (14,15,18,19) can thus be protected against mechanical and physical influences. These means (14,15,18,19) are connected via lines (16*a*,16*b*) to the cabin (1), and via suitable transmission means (23) to the sensors (13) in the cabin (1). The door frame (2*a*) in the cabin (1), which is made of metal here, is connected via ground lines (24) to the walls (14*a*,15*b*) of the evaporator unit (14) and of the foam generator (15), which are also made of metal, for the potential compensation. The ground lines (24) can be connected to a potential distributor (25), which, in turn, is connected to a ground conductor (26). What is shown here are the zone (27) for the steam, and the zone (28) for the foam. Due to the arrangement of the corresponding inlets (7, 8), the zone (27) for the steam is located above the zone (28) for the foam.

The invention claimed is:

1. A cabin for steam-bathing individuals, containing at least two outer walls, an access door, a cabin floor, and a cabin ceiling, wherein the cabin comprises a steam supply opening, a fresh air supply opening, a drain, and a waste air outlet, and a seat configured to allow cabin occupants to sit is present in the cabin, and surface materials of the cabin comprise a water-resistant material, and the cabin has a steam control and a steam regulator, which controls the steam content in the cabin and can be regulated accurately, and the performance of which is adapted to the cabin size, and the cabin has a potential compensator compensating electrical and electrostatic charges, wherein a foam inlet is present in the cabin, which is arranged below the steam supply opening, the fresh air supply opening and below the waste air outlet, the cabin has a foam control and regulator which foam can be generated and can be supplied into the cabin in a defined amount, and the foam regulator is a foam generator, which comprises an admixer for foam-forming surfactants into a water supply, a mixer, and a discharge line for the generated foam, wherein the discharge line is connected to the foam inlet opening in the cabin.

2. The cabin according to claim 1, wherein the cabin comprises an independent heater and a thermostat controlling the internal temperature.

3. The cabin according to claim 1, wherein the steam regulator is an evaporator unit for water by heat, which is connected to the cabin via lines and the steam supply opening.

4. The cabin according to claim 3, wherein the evaporator unit is a container comprising heating elements and a discharge line for the generated steam.

5. The cabin according to claim 1, wherein the foam is pressurized in the foam generator and a valve is arranged downstream from the foam generator in a flow direction so that the foam is guided into the cabin by opening the valve.

6. The cabin according to claim 5, wherein the foam generator is connected to a container for a foam concentrate which doses the foam concentrate into the foam generator upon request under pressure.

7. The cabin according to claim 1, wherein a pump is arranged in the discharge line, conveying the foam into the cabin.

8. The cabin according to claim 1, wherein a push button switch is present in the cabin, which controls the foam regulator or the pump in the discharge line for the generated foam, and thus conveys foam into the cabin for a certain period of time.

9. The cabin according to claim 1, wherein a fragrance regulator adds fragrances into the steam is present at or in the steam supply line into the cabin.

10. The cabin according to claim 1, wherein the water-resistant surface materials in the interior of the cabin consist of fine stone material, glass, or plastics.

11. The cabin according to claim 1, wherein a utility room is located outside of the cabin, in which the steam regulator and the foam regulator are arranged.

12. A method for operating a cabin according to claim 1, wherein fresh air is admitted into the cabin, and waste air is discharged, and steam and foam are meanwhile introduced at least temporarily simultaneously or alternately.

13. The method according to claim 12, wherein the cabin is operated at an internal temperature of 40 to 50° C.

14. The method according to claim 12, wherein the cabin is operated at a relative humidity of 100%.

15. The method according to claim 12, wherein the foam is introduced into the cabin in such an amount that it is above the level of the seat in the cabin, so that the individuals located in the cabin sit in a carpet of foam.

16. The method according to claim 12, wherein the supply of the foam into the cabin is achieved via a push button switch, which is arranged in the cabin and which, by being pressed, controls the foam generator.

17. The method according to claim 12, wherein the supply of the foam into the cabin is achieved via a push button switch, which is arranged in the cabin and which, by being pressed, controls a pump, arranged in the discharge line, conveying the foam into the cabin.

18. The method according claim 12, wherein the supply of the foam into the cabin is achieved via a push button switch, which is arranged in the cabin and which, by being pressed, controls a valve downstream from the foam generator.

19. The method according to claim 12, wherein fragrances are added into at least one of the steam and the foam.

20. The method according to claim 12, wherein physiologically active substances are supplied into at least one of the steam and the foam.

21. The method according to claim 12, wherein the steam contains water vapor including admixtures, which increase the comfort for staying in the cabin.

22. The cabin according to claim 1, wherein the plastics of the water-resistant surface materials in the interior of the cabin are acrylic plastics.

23. The cabin according to claim 1, further comprising a foam detector that controls the exact amount of foam and of a foam level.

24. The cabin according to claim 23, wherein the foam detector is an optical detector.

25. The cabin according to claim 1, further comprising an independent humidifier which exactly sets a humidity by a moisture measurer and a controller for the independent humidifier.

* * * * *